United States Patent [19]

Byrd

[11] Patent Number: 5,630,750
[45] Date of Patent: May 20, 1997

[54] PORTABLE RECHARGEABLE FISH SCALER ASSEMBLY

[76] Inventor: Michael E. Byrd, 4215 Gorman St. SE., Washington, D.C. 20019

[21] Appl. No.: 662,184

[22] Filed: Jun. 12, 1996

[51] Int. Cl.$^6$ .................................................. A22C 25/02
[52] U.S. Cl. ........................................ 452/101; 452/105
[58] Field of Search ................................ 452/105, 101, 452/98, 99; 30/277.4

[56] References Cited

U.S. PATENT DOCUMENTS

| | | | |
|---|---|---|---|
| 1,324,581 | 12/1919 | Boesch et al. | 452/101 |
| 1,758,675 | 5/1930 | Reilly | 452/101 |
| 1,982,083 | 11/1934 | Strand | 452/101 |
| 2,557,272 | 6/1951 | Gabriel | 452/101 |
| 2,875,642 | 3/1959 | Colburn | 452/101 |
| 3,590,424 | 7/1971 | Shults | 452/101 |
| 3,694,014 | 9/1972 | Rossbach et al. | 289/17 |
| 4,107,819 | 8/1978 | Salzon | 452/101 |
| 4,432,117 | 2/1984 | Iskiw | 452/98 |
| 4,649,744 | 3/1987 | Cotillier | |
| 5,221,229 | 6/1993 | Brophy | 452/105 |

FOREIGN PATENT DOCUMENTS 2421559 11/1979 France ................................ 452/101

*Primary Examiner*—Willis Little
*Attorney, Agent, or Firm*—Alfred F. Hoyte, Jr.

[57] ABSTRACT

A cordless, rechargeable, fish scaler assembly is provided. The scaler has a substantially cylindrical main body with a handle portion and a scaler portion. The scaler portion includes a scale guard which is rigidly connected to the handle portion and a plurality of longitudinally extending blades supported by a shall which is rotatably connected to the handle portion. The blades are partially enclosed within a cylindrical housing which operates to create a hollow space about the shaft thereby enhancing buoyancy of the scaler. The handle portion contains a rechargeable battery pack and also has a hollow portion to enhance buoyancy. The assembly includes at least two types of battery charging systems.

3 Claims, 2 Drawing Sheets

PORTABLE RECHARGEABLE FISH SCALER ASSEMBLY

BACKGROUND OF THE INVENTION

1. Field of the Invention

The present invention relates to fish scalers. More specifically, it relates to an improved portable, rechargeable, and buoyant fish scaler assembly.

2. Description of the Prior Art

As will be seen, the simplicity and effectiveness of my invention is not rivaled in the prior art.

U.S. Pat. No. 3,590,424 issued to Ralph Shults discloses a fish scaling device which is portable and is powered by a motor which uses a conventional battery. By contrast, the present invention is powered by rechargeable batteries and includes accessories allowing the batteries to be recharged from a wall outlet or a cigarette lighter.

U.S. Pat. No. 5,221,229 issued to Neil Brophy discloses a fish scaling apparatus which has a two part assembly. A first part of the assembly contains a motor which is connected to drive a scaling head which is contained within the second part of the assembly. The assembly is relatively large and bulky and apparently not intended to be portable. By contrast, the present invention contemplates a portable assembly having a plurality of components which are easily contained within a buoyant carrying case.

U.S. Pat. No. 4,162,558 issued to Rubio discloses a fish scaling tool which has a scaling head attachable to a drill. The scaling head is made of solid metal. By contrast, the device of the present invention has a metal covered scaling head with a hollow interior which allows for buoyancy.

U.S. Pat. No. 4,667,372 issued to Till discloses a fish scaler having an open scaling head with a plurality of blades. By contrast, the device of the present invention has a metal covered scaling head with a hollow interior which allows for buoyancy.

None of the above inventions and patents, taken either singly or in combination, is seen to describe the instant invention as claimed.

SUMMARY OF THE INVENTION

Briefly, the invention comprises a cordless, rechargeable, fish scaler assembly. The scaler has a substantially cylindrical main body with a handle portion and a scaler portion. The scaler portion includes a scale guard which is rigidly connected to the handle portion and a plurality of longitudinally extending blades supported by a shaft which is rotatably connected to the handle portion. The blades are partially enclosed within a cylindrical housing which operates to create a hollow space about the shaft thereby enhancing buoyancy of the scaler. The handle portion contains a rechargeable battery pack and also has a hollow portion to enhance buoyancy. The assembly includes at least two types of battery charging systems.

Accordingly, it is a principal object of the invention to provide a new and improved fish scaler assembly.

It is a major object of this invention to provide a fish scaler assembly which is portable and buoyant.

It is another object of the invention to provide such an improved fish scaler assembly which has a rechargeable battery pack.

It is still another object of the invention to provide an improved fish scaler assembly of relatively small size.

It is another object of the invention to provide an improved fish scaler assembly which has rotating scale removing blades.

It is another object of the invention to provide an improved fish scaler assembly where the direction of rotation of the blades is reversible.

It is another object of the invention to provide an improved fish scaler assembly which has a hand strap and a buoyant carrying case.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
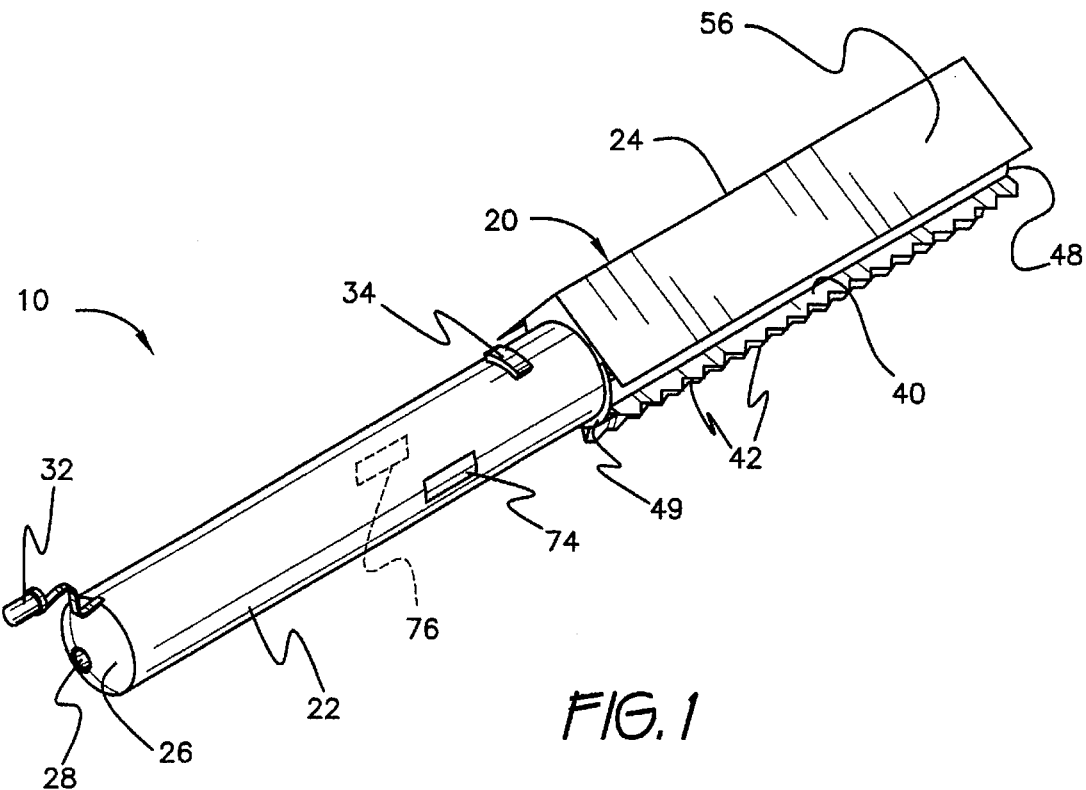
FIG. 1 is a side view of the fish scaler of the present invention.

Referring now to FIG. 1, a side view of the fish scaler of the present invention, generally indicated by the numeral 10, is shown. The scaler 10 has a substantially cylindrical main body 20 having a sealed handle portion 22 and a scaling portion 24.

The handle portion 22 has a hollow interior which contains a battery and a motor (not shown). The end of the handle portion 22 has a removable cover 26 which may be threadably engaged with the handle portion 22. Alternatively, the cover 26 has a plurality of tabs (not shown) which can engage slots formed in the handle portion thereby forming an insert and twist type of locking engagement. A washer or other sealing means (not shown) is preferably used to effect a watertight seal between the cover 26 and the handle portion 22.

The cover 26 has a terminal 28 formed therein for receiving a connector from a battery charger which will serve to recharge the batteries as will be explained later. A sealing plug 30 is permanently connected to the handle portion 22 and has a cylindrical protruding portion 32 for releasable connection into the terminal 28. The sealing plug 30 serves to keep water, dirt, and debris from entering the terminal 28 and also helps to keep the interior of the handle portion 22 watertight.

A switch 34 is provided on the handle portion 22 for reversing the rotation of the motor to accommodate both left and right handed users. In the preferred embodiment, the switch 34 is a sliding switch connected to a potentiometer thereby allowing for variable speed operation in both directions.

Figure 2:
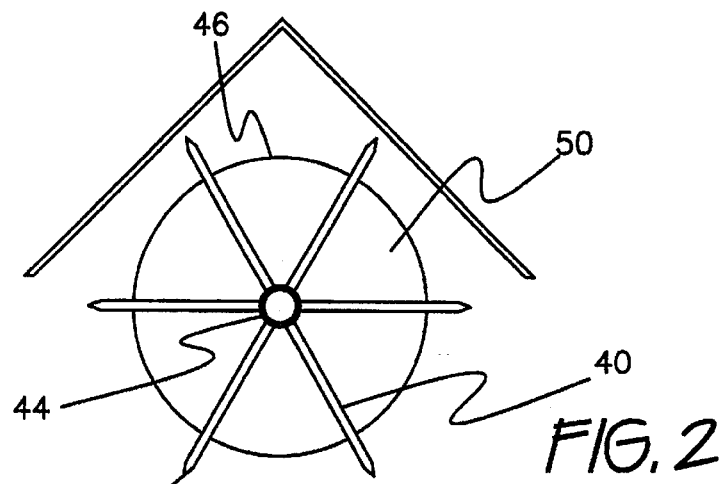
FIG. 2 is a sectional front view of the fish scaler of the present invention.

The scaler portion 24 has a plurality of blades 40 having serrated edges or teeth 42 allowing the blades 40 to cut into a fish and thereby remove the scales. The teeth 42 are relatively small to prevent unnecessary removal of the underlying flesh of the fish. The blades 40 are connected to a centralized shaft 44 as may be seen more clearly in FIG. 2. Although six blades 40 are shown more or less blades 40 may be used. Preferably the blades 40 and shaft 44 are of unitary construction with the blades 40 connected along the entire length of the shaft 44 and radially extending therefrom.

A cylindrical covering 46 having an end face 48, 49 secured to both ends thereof is provided to create a sealed air space 50 about the shaft 44. The space 50 serves to provide buoyancy for the scaler 20 in the event it is inadvertently dropped in the water. Preferably, the covering 46, the shaft 44, and the blades 40 are a single unitary piece to ensure a watertight construction. The entire assembly could be made of a durable material such as stainless steel.

The shaft 44 is connected to the motor via a gear drive assembly which may be a conventional assembly such as that shown in the U.S. Pat. No. 3,590,424 issued to Shults which is herein incorporated by reference. A gasket (not shown) may be secured about the opening (not shown) in the handle portion 22 through which the shaft 44 extends to ensure a watertight interface between the handle portion and the scaler portion. It should be mentioned that sufficient airspace should be left in the handle portion 22 and the scaler portion 24 to ensure buoyancy of the scaler 10. The total airspace needed to ensure buoyancy can be calculated as a function of the total weight of the scaler 10 as is known. It can also be determined by trial and error by exchanging the motor and batteries and using as many lightweight components as possible.

A scale guard 56 is secured to the handle portion 22. The scale guard 56 functions to prevent loosened fish scales from being propelled into the face of the operator. The scale guard 56 may be removably attached to the handle portion 22 to facilitate easier cleaning of the scale guard 56. The scale guard 56 is preferably made of a lightweight rigid material such as ABS plastic.

Figure 4:
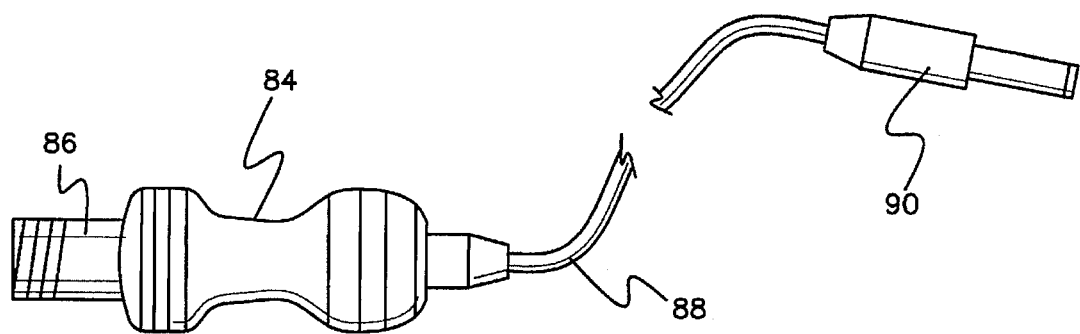
FIG. 4 is a side view of an alternative battery charger for use with the present invention.
Figure 3:
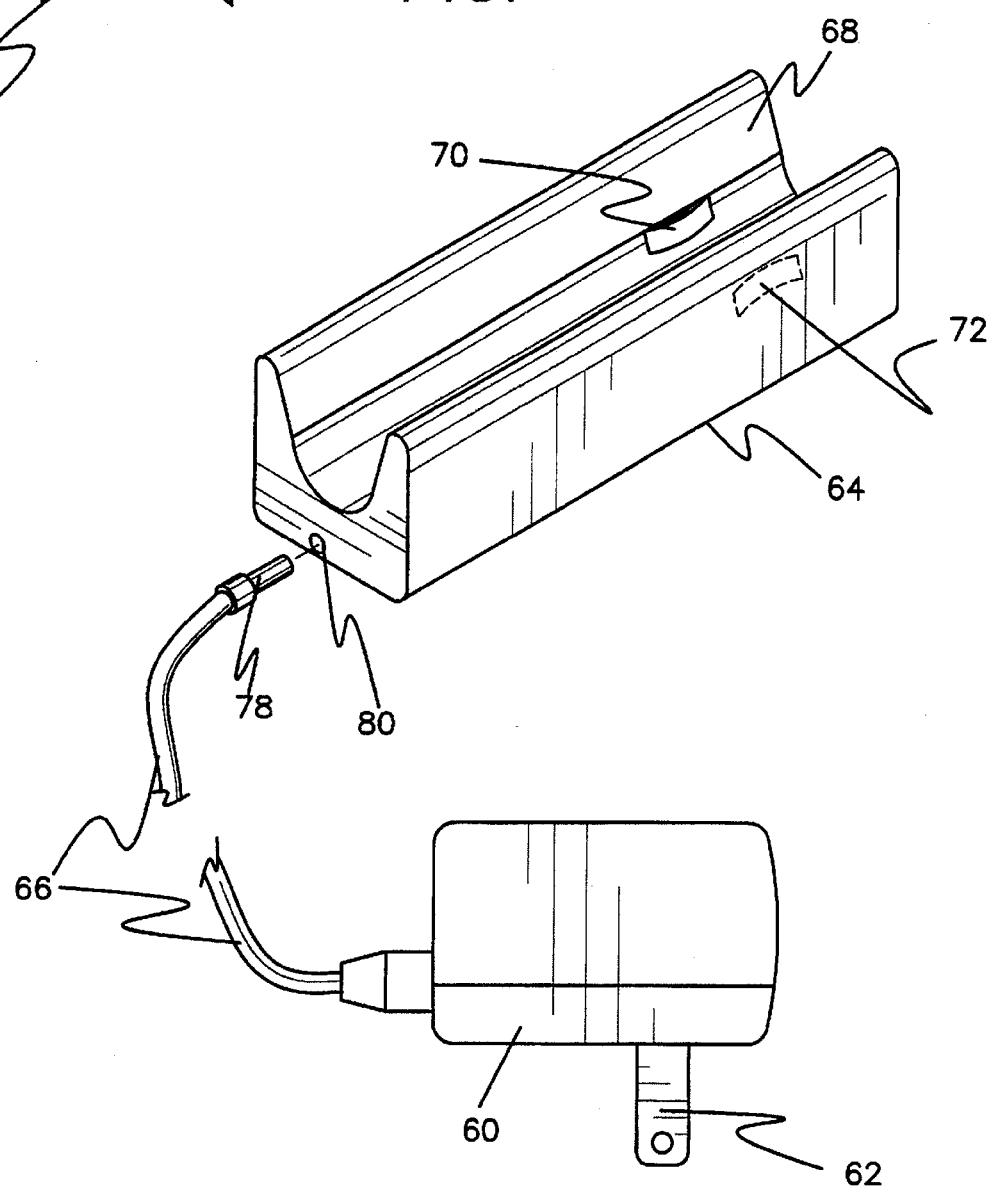
FIG. 3 is a perspective view of the battery charger and receptacle of the present invention.

Referring now to FIGS. 3 and 4 the battery charging accessories are shown. The assembly shown in FIG. 3 includes a plug-in unit 60 having two prongs 62 adapted for insertion into a standard AC wall outlet. The plug-unit 60 includes a step-down transformer and rectification and filter circuits as is well known in the art. The plug-in unit 60 is connected to a handle rest 64 via cable 66. The handle rest 64 includes a U-shaped recess 68 adapted to secure the scaler 10. Optionally, the handle rest 64 may include apertures adapted for locking engagement with prongs extending from the scaler 10 to prevent relative movement of the scaler 10 while in the handle rest 64. A pair of contact pads 70, 72 are electrically connected to cable 66 to provide a charging voltage to the batteries via contact pads 74, 76 on the scaler 10. Cable 66 includes a connecter 78 which is insertable into terminal 80.

For mobile charging, a cigarette lighter adapter 84 is provided. The adapter 84 includes a standard terminal 86 for insertion into a cigarette lighter receptacle. The adapter 84 includes standard internal electronics which are connected to cable 88. The cable 88 terminates in a connecter 90 which is insertable into terminal 80.

In operation, the scaler 10 is removed from the handle rest 64 once the batteries are recharged and is applied to the fish in a conventional manner. The direction of rotation is reversed as desired using the switch 34. For products with softer coverings, a brush may be used in lieu of blades 40.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:

1. A portable fish scaler assembly comprising:

a housing having a handle portion and a sealed scaler portion, the handle portion having a hollow interior and containing a battery pack and a motor;

said scaler portion having a blade assembly with a plurality of blades extending radially therefrom and connected to a central shaft which extends into an aperture in said handle portion, the shaft operably connected to said motor for rotation about its axis, a pair of endcaps secured to opposite ends of said blade assembly thereby forming a sealed hollow interior, said hallow interior having a sufficient volume to allow for bouyancy in water of said housing;

and a scale guard secured to said handle portion and extending over and partially enclosing said blade assembly.

2. The assembly of claim 1 where said battery pack contains rechargeable batteries.

3. The assembly of claim 1 including recharging means connectable to said handle portion.

* * * * *